(12) United States Patent
Miyake

(10) Patent No.: US 7,934,369 B2
(45) Date of Patent: May 3, 2011

(54) EXHAUST GAS PURIFYING APPARATUS FOR INTERNAL COMBUSTION ENGINE

(75) Inventor: Teruhiko Miyake, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 229 days.

(21) Appl. No.: 11/992,291

(22) PCT Filed: Jun. 21, 2007

(86) PCT No.: PCT/JP2007/062952
§ 371 (c)(1),
(2), (4) Date: Mar. 20, 2008

(87) PCT Pub. No.: WO2007/148828
PCT Pub. Date: Dec. 27, 2007

(65) Prior Publication Data
US 2009/0113875 A1    May 7, 2009

(30) Foreign Application Priority Data

Jun. 21, 2006    (JP) .............................. 2006-171036

(51) Int. Cl.
*F01N 3/00*    (2006.01)
(52) U.S. Cl. ................ 60/277; 60/286; 60/295; 60/297; 60/303
(58) Field of Classification Search .................... 60/277, 60/286, 295, 297, 301, 303, 311
See application file for complete search history.

(56) References Cited

U.S. PATENT DOCUMENTS

| | | | |
|---|---|---|---|
| 4,665,690 A | 5/1987 | Nomoto et al. | |
| 5,628,186 A * | 5/1997 | Schmelz | 60/274 |
| 6,487,852 B1 | 12/2002 | Murphy et al. | |
| 7,143,756 B2 | 12/2006 | Kojima et al. | |
| 7,533,524 B2 * | 5/2009 | Wang et al. | 60/297 |
| 7,677,032 B2 * | 3/2010 | Berryhill et al. | 60/297 |
| 7,765,793 B2 * | 8/2010 | Nishiyama et al. | 60/280 |
| 7,858,060 B2 * | 12/2010 | Gady et al. | 423/213.5 |
| 2004/0221571 A1 | 11/2004 | Lewis, Jr. et al. | |

FOREIGN PATENT DOCUMENTS

EP    1 176 295 A2    1/2002
JP    A 06-002530    1/1994

(Continued)

*Primary Examiner* — Binh Q Tran
(74) *Attorney, Agent, or Firm* — Oliff & Berridge, PLC

(57) ABSTRACT

An exhaust gas purifying apparatus for an internal combustion engine is provided. The apparatus includes a recoverable type exhaust gas purifying device provided in an exhaust passage, a reducing agent addition device for adding a reducing agent into the exhaust passage upstream of the exhaust gas purifying device, an operation control device for controlling operation of the reducing agent addition device such that the reducing agent is added into the exhaust passage in a recovering process of the exhaust gas purifying device, a pressure obtaining device for obtaining pressure in the exhaust passage downstream from the reducing agent addition device and upstream from the exhaust gas purifying device; and a diagnosing device for diagnosing the reducing agent addition device based on the pressure obtained by the pressure obtaining device at an estimate arrival-time when the reducing agent added from the reducing agent addition device is estimated to arrive at the exhaust gas purifying device in a case the operation of the reducing agent addition device is controlled by the operation control device such that the reducing agent is added into the exhaust passage.

6 Claims, 6 Drawing Sheets

FOREIGN PATENT DOCUMENTS

| | | |
|---|---|---|
| JP | A-2002-242663 | 8/2002 |
| JP | A-2003-254048 | 9/2003 |
| JP | A 2003-269147 | 9/2003 |
| JP | A-2005-76462 | 3/2005 |
| JP | A 2005-188396 | 7/2005 |
| JP | A 2005-214175 | 8/2005 |
| JP | A 2005-273549 | 10/2005 |

* cited by examiner

EXHAUST GAS PURIFYING APPARATUS FOR INTERNAL COMBUSTION ENGINE

TECHNICAL FIELD

The present invention relates to an exhaust gas purifying apparatus for an internal combustion engine having a recoverable type exhaust gas purifying catalyst or a particulate filter, and a reducing agent addition valve for adding reducing agent from upstream of the recoverable type exhaust gas purifying catalyst or the particulate filter.

BACKGROUND ART

There is known an exhaust gas purifying apparatus which includes a reducing catalyst for reducing and purifying nitrogen oxide by a reducing agent, and an injection nozzle for injecting and supplying the reducing agent into an exhaust pipe upstream of the reducing catalyst, and determines that a constituent of the reducing agent are accumulated in the exhaust pipe when the difference between pressures of exhaust gas upstream section of the exhaust pipe to which the reducing agent adheres and a pressure of exhaust downstream of this portion becomes equal to or higher than a predetermined pressure, it is (see patent publication JP-A-2005-273549). Furthermore, patent publications JP-A-2005-188396, JP-A-2005-214175, JP-A-2003-269147, JP-A-6-2530 are related to the present invention as prior art.

In the patent publication JP-A-2005-273549, accumulation of the constituents of the reducing agent in the exhaust pipe is determined by referring to the pressure difference between the front side and the rear side of the section in which the reducing agent is adhered to. However, the pressure in the exhaust passage also varies when the reducing agent arrives at the exhaust gas purifying catalyst or the particulate filter. The pressure in the exhaust passage varies in accordance with an amount of the reducing agent added into the exhaust passage. Therefore, it is conceived that the pressure varies differently between when anomaly exists in the reducing agent addition device and when the reducing agent addition device is in a normal state. Thus, the reducing agent addition device such as the injection nozzle can be diagnosed by referring to the pressure variation in the exhaust passage. However, the above-described patent publications do not disclose any diagnosis of reducing agent addition device based on a pressure in the exhaust passage.

Hence, it is an object of the present invention to provide an exhaust gas purifying apparatus for an internal combustion engine capable of diagnosing a reducing agent addition device based on a pressure in the exhaust passage when a reducing agent is added to exhaust gas.

DISCLOSURE OF THE INVENTION

An exhaust gas purifying apparatus for an internal combustion engine of the present invention includes a recoverable type exhaust gas purifying device provided in an exhaust passage, a reducing agent addition device for adding a reducing agent into the exhaust passage upstream of the exhaust gas purifying device, an operation control device for controlling operation of the reducing agent addition device such that the reducing agent is added into the exhaust passage in a recovering process of the exhaust gas purifying device, a pressure obtaining device for obtaining a pressure in the exhaust passage downstream from the reducing agent addition device and upstream from the exhaust gas purifying device, and a diagnosing device for diagnosing the reducing agent addition device based on the pressure obtained by the pressure obtaining device at an estimate arrival-time when the reducing agent added from the reducing agent addition device is estimated to arrive at the exhaust gas purifying device in a case the operation of the reducing agent addition device is controlled by the operation control device such that the reducing agent is added into the exhaust passage.

When the reducing agent addition device is in a normal state, an appropriate amount of reducing agent for sufficiently carrying out the recovery process of the exhaust gas purifying device is added from the reducing agent addition device. When, in this case, the reducing agent arrives at the exhaust gas purifying device, the reducing agent adheres to the exhaust gas purifying device to clog part of the exhaust gas purifying device. Therefore, it becomes difficult for exhaust gas to pass through the exhaust gas purifying device. Thus, the pressure in the exhaust passage upstream from the exhaust gas purifying device varies. On the contrary, when an injection opening, through which fuel is added into the exhaust passage from the reducing agent addition device, is clogged with deposits or the like, or when the reducing agent is not added from the reducing agent addition device due to anomaly existed in the reducing agent addition device, including a case when the device is inoperable due to malfunction, or when an amount of reducing agent less than an appropriate amount is added, the exhaust gas purifying device becomes difficult to be clogged. Thus, the pressure variation in the exhaust passage shows differently from when the appropriate amount of the reducing agent is added to exhaust gas. Thus, the pressure in the exhaust passage upstream from the exhaust gas purifying device at the estimate arrival-time varies differently between when the reducing agent addition device is in a normal state and when anomaly exists in the reducing agent addition device. Therefore, it is possible to diagnose anomaly of the reducing agent addition device from the pressure variation in the exhaust passage at the estimate arrival-time when the reducing agent added from the reducing agent addition device is estimated to arrive at the exhaust gas purifying device. Furthermore, since, in the exhaust gas purifying apparatus of the present invention, the anomaly of the reducing agent addition device is diagnosed based on the pressure in the exhaust passage at the estimate arrival-time, influence of other factors can be suppressed even if the pressure in exhaust varies due to the other factors such as pulsation of exhaust gas. Thus, it is possible to enhance the precision of diagnosis of the reducing agent.

In an aspect of the exhaust gas purifying apparatus according to the invention, the diagnosing device may diagnose that anomaly exists in the reducing agent addition device when a difference between the pressure obtained by the pressure obtaining device at the estimate arrival-time and the pressure obtained by the pressure obtaining device before the operation of the reducing agent addition device is controlled by the operation control device is equal to or smaller than a predetermined threshold value. As described above, when anomaly exists in the reducing agent addition device, the exhaust gas purifying device becomes difficult to be clogged as compared to when the reducing agent addition device is in a normal state, and thus, it is conceived that the pressure variation in the exhaust passage at the estimate arrival-time is small. Thus, the diagnosing device can diagnose anomaly in the reducing agent addition device when the pressure variation at the estimate arrival-time is equal to or smaller than the predetermined threshold value.

In this aspect, the diagnosing device may include a threshold value correcting device which corrects the predetermined threshold value based on at least one of the flow rate of exhaust gas and the temperature of the exhaust gas purifying device in a case the operation of the reducing agent addition device is controlled by the operation control device such that the reducing agent is added into the exhaust passage. Exhaust gas is accumulated upstream from the exhaust gas purifying device when part of the exhaust gas purifying device is clogged with the reducing agent. Since the amount of the accumulated exhaust gas becomes larger as the flow rate of exhaust gas when the reducing agent is added becomes higher, the pressure variation in the exhaust passage at the estimate arrival-time becomes greater as the flow rate of the exhaust gas becomes larger. As the temperature of the exhaust gas purifying device becomes higher, the reducing agent which adheres to the exhaust gas purifying device is evaporated in a shorter time. Therefore, it becomes difficult for the exhaust gas purifying device to be clogged. Thus, the pressure variation in the exhaust passage at the estimate arrival-time becomes smaller as the temperature of the exhaust gas purifying device becomes higher. The pressure variation in the exhaust passage at the estimate arrival-time is influenced by the flow rate of exhaust gas and the temperature of the exhaust gas purifying device. In this aspect, since the predetermined threshold value is corrected based on at least one of the flow rate of exhaust gas and the temperature of the exhaust gas purifying device, it is possible to enhance the precision of the diagnosis of the reducing agent addition device.

In an aspect of the exhaust gas purifying apparatus of the present invention, a particulate filter which collects particulates in exhaust gas is provided as the exhaust gas purifying device, and the pressure obtaining device may be a pressure difference obtaining device which obtains a pressure of exhaust gas upstream of the particulate filter and a pressure of exhaust gas downstream of the particulate filter and obtains a difference between these pressures. When the exhaust passage is provided with the particulate filter, A pressure difference obtaining device is generally provided for obtaining an amount of particulate matters (PM) adhered to the particulate filter. In this aspect, since the pressure difference obtaining device is used as the pressure obtaining device, a device for obtaining a pressure in the exhaust passage does not need to be newly provided. Thus, unnecessary cost up can be avoided.

In an aspect of the exhaust gas purifying apparatus of the present invention, a hydrocarbon-based reducing agent may be added from the reducing agent addition device. If the hydrocarbon-based reducing agent is added to the exhaust gas, an air fuel ratio of exhaust gas can be made richer than the theoretical air fuel ratio. Furthermore, the exhaust gas purifying device can be heated up by oxidizing the hydrocarbon-based reducing agent in the exhaust gas purifying device. Thus, by adding the reducing agent into the exhaust passage, the recovery process of the exhaust gas purifying catalyst or the particulate filter can be carried out, for example, since their recovery process progresses when the exhaust air fuel ratio becomes richer than the theoretical air fuel ratio.

In this aspect, the exhaust gas purifying apparatus may further includes an oxygen concentration obtaining device for obtaining oxygen concentration in the exhaust passage downstream from the reducing agent addition device and upstream from the exhaust gas purifying device, and an auxiliary diagnosing device for diagnosing the reducing agent addition device based on the oxygen concentration obtained by the oxygen concentration obtaining device at the estimate arrival-time in a case the operation of the reducing agent addition device is controlled by the operation control device such that the reducing agent is added into the exhaust passage. It is conceived that the amount of reducing agent to be added into the exhaust passage is different between when anomaly exists in the reducing agent addition device and when the reducing agent addition device is in a normal state. Thus, the air fuel ratio of exhaust gas, namely, the oxygen concentration in the exhaust gas, in the case the operation of the reducing agent addition device is controlled by the operation control device is affected by the condition of the reducing agent addition device. For example, when the reducing agent is not added into the exhaust passage due to the anomaly existed in the reducing agent addition device, the oxygen concentration varies little even at the estimate arrival-time. In this manner, it is also possible to diagnose the reducing agent addition device based on the oxygen concentration at the estimate arrival-time. Since this aspect includes the auxiliary diagnosing device for diagnosing the reducing agent addition device based on the oxygen concentration at the estimate arrival-time, it is possible to further enhance the precision of diagnosis of the reducing agent addition device.

As explained above, according to the present invention, it is possible to diagnose the reducing agent addition device based on a pressure in an exhaust passage in a case the operation of the reducing agent addition device is controlled by the operation control device.

BRIEF DESCRIPTION OF THE REFERENCE NUMERALS

1 Internal combustion engine
4 Exhaust passage
8 Fuel addition valve (Reducing agent addition device)
9 Particulate filter (Exhaust gas purifying device)
20 Engine control unit (Operation control device, Diagnosing device, Auxiliary diagnosing device, Threshold value correcting device)
22 Oxygen concentration sensor (Oxygen concentration obtaining device)
23 Exhaust gas pressure sensor (Pressure obtaining device)

BEST MODE FOR CARRYING OUT THE INVENTION

Figure 1:
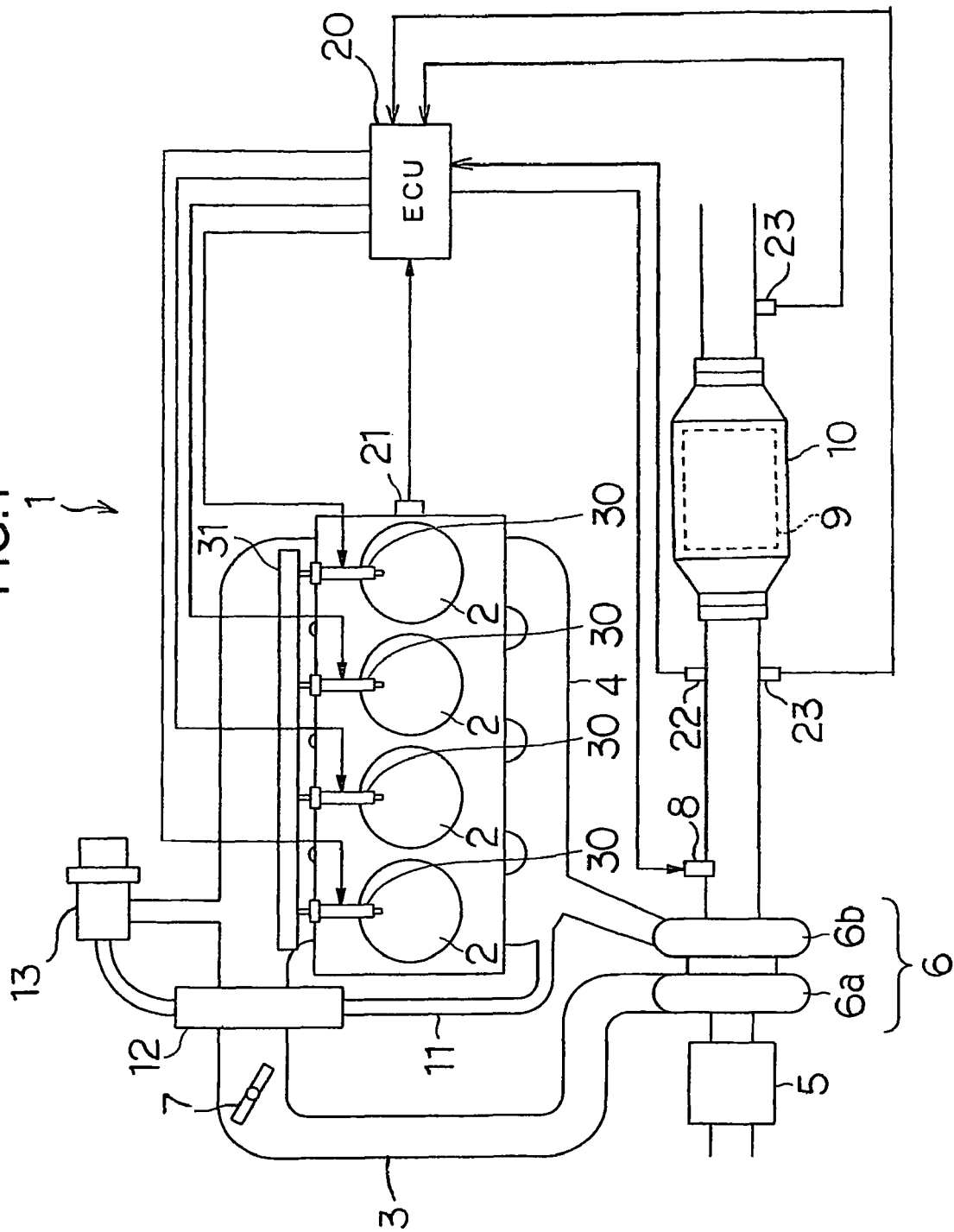
FIG. 1 is a view showing an internal combustion engine in which an exhaust gas purifying apparatus according to an embodiment of the present invention is incorporated.

FIG. 1 shows an internal combustion engine in which an exhaust gas purifying apparatus according to an embodiment of the present invention is incorporated. The internal combustion engine 1 (also referred as engine, hereinafter) shown in FIG. 1 is a diesel engine, and is mounted in a vehicle as a driving power source. The internal combustion engine 1 includes a plurality of (four in FIG. 1) cylinders 2, and an intake passage 3 and an exhaust passage 4 connected to the cylinders 2. The intake passage 3 includes an air filter 5 for filtering intake air, a compressor 6a of a turbocharger 6, and an intake throttle valve 7 for adjusting an intake amount. The exhaust passage 4 includes a turbine 6b of the turbocharger 6, a fuel addition valve 8 as a reducing agent addition device, and an exhaust gas purifying apparatus 10 including a particulate filter 9 (also referred as filter, hereinafter) as an exhaust gas purifying device. The filter 9 supports store-reduction type NOx catalyst material (also referred as NOx catalyst, hereinafter), and also functions as a store-reduction type NOx catalyst. The particulate filter 9 and the store-reduction type NOx catalyst material may be known filter and material, and thus, detailed explanation thereof will be omitted. As shown in FIG. 1, the fuel addition valve 8 can add fuel (diesel oil) as a reducing agent into the exhaust passage 4 upstream of the filter 9. The exhaust passage 4 and the intake passage 3 are connected to each other through an EGR passage 11. The EGR passage 11 is provided with an EGR cooler 12 and an EGR valve 13.

The NOx catalyst supported in the filter 9 stores NOx when an exhaust air fuel ratio is leaner than the theoretical air fuel ratio, and the NOx catalyst releases the stored NOx and reduces NOx into nitrogen (N2) when the exhaust air fuel ratio is richer than the theoretical air fuel ratio. The amount of NOx storable in the NOx catalyst is upper limited. Therefore, the exhaust gas purifying performance of the NOx catalyst is maintained at a high level by carrying out NOx reduction at predetermined intervals, in which NOx is released from the NOx catalyst and reduced into $N_2$ so that the amount of the stored NOx does not arrive at the upper limit. Furthermore, the NOx catalyst is poisoned by sulfur oxide (SOx) included in exhaust gas. Therefore, S-recovery is carried out in which the NOx catalyst is heated up to a temperature range where sulfur (S) is released from the NOx catalyst, and the air fuel ratio of the exhaust gas is set equal to or richer than the theoretical air fuel ratio so that the function of the NOx catalyst is recovered from the sulfur poisoning. Further, PM-recovery is carried out in which the NOx catalyst is heated up to a temperature range where the PM is oxidized and removed so that PM collected by the filter 9 is to be removed. Hereinafter, the combination of NOx reduction, S-recovery, and PM-recovery may also be referred as function recovery process. The function recovery process is carried out by adding a fuel from the fuel addition valve 8 into the exhaust passage 4 upstream of the filter 9.

The storage-reduction type NOx catalyst may be a catalyst which can hold NOx, and the holding of NOx is not limited to one of modes of absorption and adsorption by the term "storage". Any types of poisoning by SOx are involved. Furthermore, any types of release of NOx and SOx are involved.

Operation of the fuel addition valve 8 is controlled by an engine control unit (ECU) 20. The ECU 20 is a computer including a microprocessor and peripheral devices such as a RAM and a ROM required for operation of the microprocessor. The ECU 20 is a known computer unit which controls the operating condition of the engine 1 by operating various devices such as an injector 30 which injects fuel to the cylinders 2, and a pressure adjusting valve of a common rail 31, which accumulates high-pressure fuel to be supplied to the injector 30. The ECU 20 calculates an amount of fuel to be injected from the injector 30 with reference to the operating condition of the engine 1, and controls the operation of the injector 30 such that the calculated amount of fuel is injected into the cylinders 2. Various sensors are connected to the ECU 20, such as a crank angle sensor 21 for outputting a signal corresponding to a crank angle of the engine 1, and an oxygen concentration sensor 22 for outputting a signal corresponding to the oxygen concentration in the exhaust passage 4 as an oxygen concentration obtaining device.

These sensors are connected as obtaining devices for obtaining various physical or state quantities to be referred to for controls. As shown in FIG. 1, the oxygen concentration sensor 22 is provided in the exhaust passage 4 downstream from the fuel addition valve 8 and upstream from the filter 9.

As mentioned above, the function recovery process needs to be carried out to maintain the exhaust gas purifying performances of the filter 9 and the NOx catalyst at high levels. The ECU 20 determines whether the function recovery process should be carried out. If the ECU 20 determines that the function recovery process should be carried out, the ECU 20 controls operation of the fuel addition valve 8 such that an appropriate amount of fuel is added into the exhaust passage 4 from the fuel addition valve 8 in the function recovery process. For example, the ECU 20 carries out the PM-recovery such that the difference (also referred as pressure difference, hereinafter) between the pressure in the exhaust passage 4 upstream of the filter 9 and the pressure in the exhaust passage 4 downstream of the filter 9 is maintained to equal to or smaller than a preset permissible value, so as to prevent clogging of the filter 9 with the collected PM. As shown in FIG. 1, exhaust gas pressure sensors 23 which output signals corresponding to the pressure in the exhaust passage 4 are provided in the exhaust passage 4 upstream from the filter 9 and the exhaust passage 4 downstream from the filter 9, respectively. The ECU 20 refers to the output signals from the exhaust gas pressure sensors 23 and obtains the pressure difference, and determines whether the PM-recovery should be executed based on the pressure difference. Since the output signals from the exhaust gas pressure sensors 23 is referred to and the pressure difference is obtained in this manner, the exhaust gas pressure sensors 23 function as pressure difference obtaining device of the present invention. When it is determined that the PM-recovery should be carried out, the ECU 20 calculates a necessary amount of fuel to be added to increase the temperature of the filter 9 to a target temperature (e.g., 650° C.) in the PM-recovery, and operates the fuel addition valve 8 such that the calculated amount of fuel is added into the exhaust passage 4. The ECU 20 determines whether the NOx reduction and the S-recovery should be carried out. If it is determined that the NOx reduction and the S-recovery should be carried out, the ECU 20 calculates the amount of fuel necessary for the recovery processes, and operates the fuel addition valve 8 such that the calculated amount of fuel is added into the exhaust passage 4. By controlling the operation of the fuel addition valve 8 in this manner, the ECU 20 functions as the operation control device of the present invention. Of the two exhaust gas pressure sensors 23, one provided upstream is referred as upstream exhaust gas pressure sensor, and the other one provided downstream is referred as downstream exhaust gas pressure sensor. As shown in FIG. 1, the upstream exhaust gas pressure sensor 23 is provided downstream from the fuel addition valve 8 and upstream from the filter 9. Thus, the upstream exhaust gas pressure sensor 23 functions as pressure obtaining device of the present invention.

If anomaly exists in the fuel addition valve 8 in the case the function recovery process is to be executed, the amount of fuel calculated by the ECU 20 is not added to the exhaust passage 4, and thus the function recovery process of the filter 9 might be carried out insufficiently, so that the exhaust emission is deteriorated. To swiftly find anomaly in the fuel addition valve 8, the ECU 20 executes a fuel addition valve diagnostic routine shown in FIG. 2 repeatedly at predetermined intervals in the operation of the engine 1. By executing the routine shown in FIG. 2, the ECU 20 functions as diagnosing device of the present invention.

Figure 2:
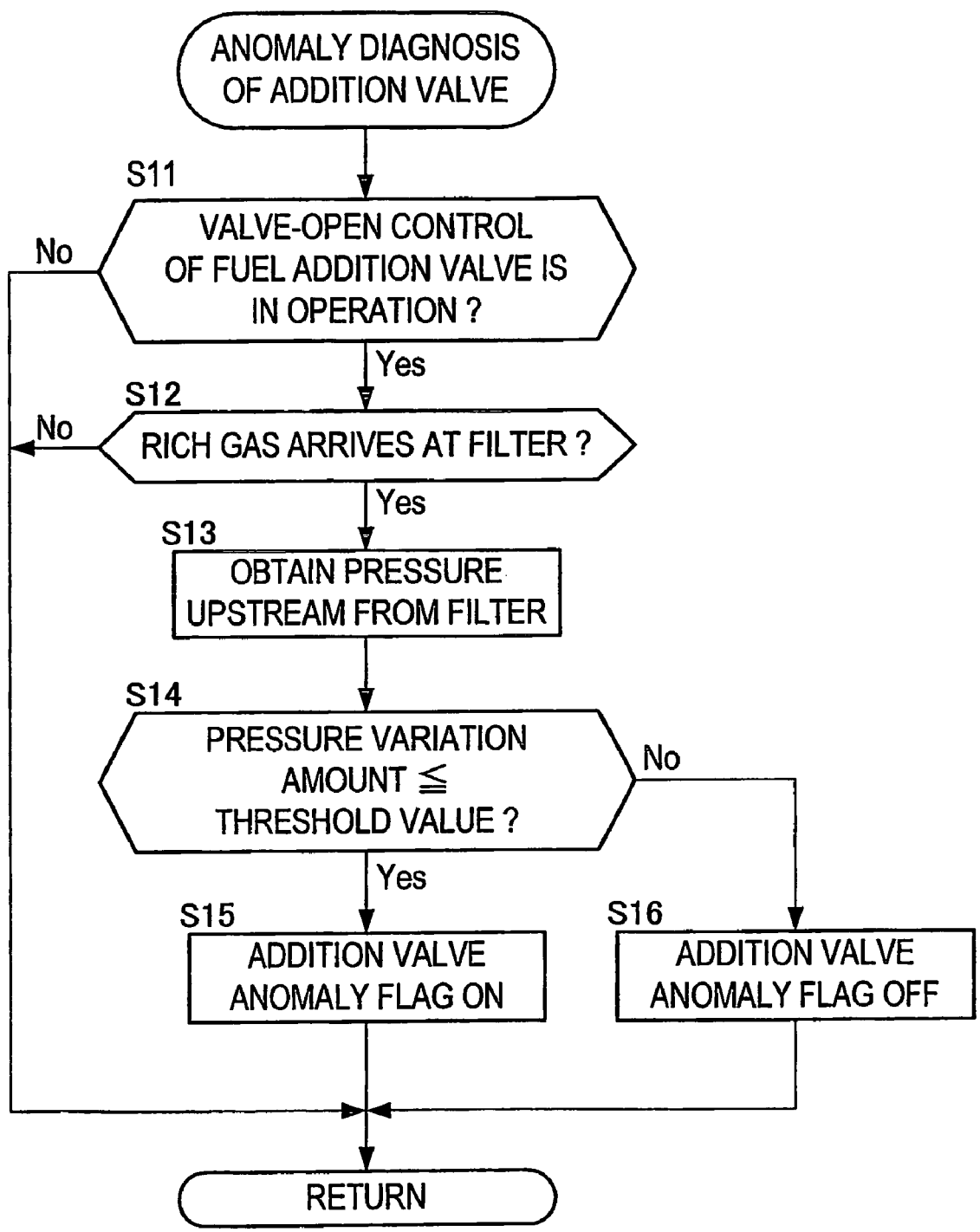
FIG. 2 is a flowchart showing a fuel addition valve diagnostic routine executed by an ECU.

In the fuel addition valve diagnostic routine shown in FIG. 2, the ECU 20 determines whether the valve-open control is in operation for the fuel addition valve 8 (Step S11), so that the fuel addition valve 8 is to be opened. If it is determined that the open control is not in operation for the fuel addition valve 8, the current routine is ended.

Figure 3:
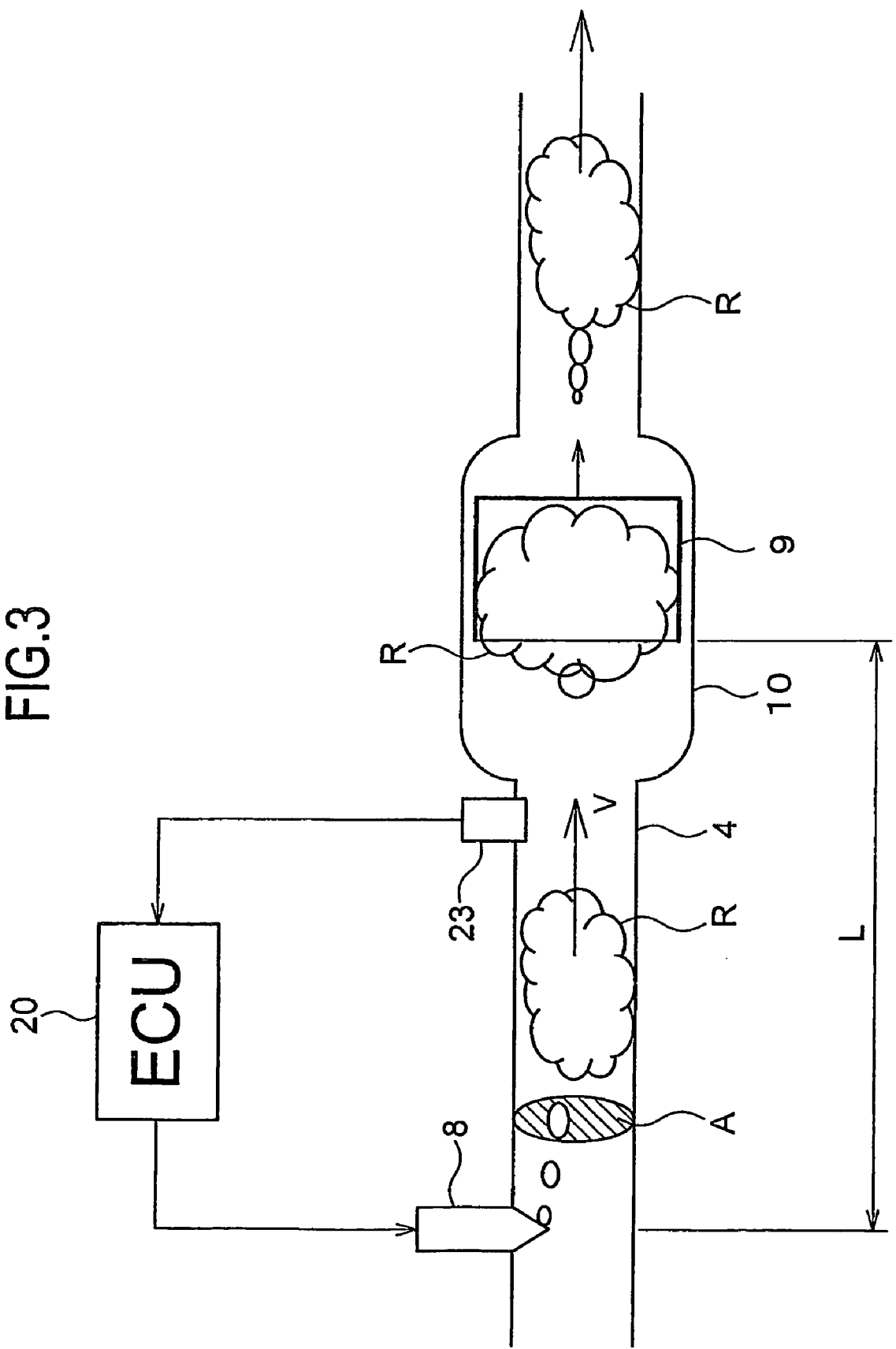
FIG. 3 is a view showing one example of a state in which rich gas move-s in an exhaust passage.

Otherwise, when it is determined that the open control is carried out for the fuel addition valve 8, the procedure is proceeded to step S12. The ECU 20 determines whether exhaust gas R (referred as rich gas, hereinafter), whose air fuel ratio is estimated to have been changed to the rich side with fuel in the case the fuel is added into the exhaust passage 4, arrives at the filter 9. Whether the rich gas R arrives at the filter 9 is determined by following the method below, for example. First, an exhaust gas flow rate Q [$m^3$/second] flowing into the filter 9 is estimated. The exhaust gas flow rate Q is estimated based on an intake air amount of the engine 1, a fuel amount injected into the cylinders 2 from the injector 30, and an exhaust gas amount returned to the intake passage 3 from the exhaust passage 4 through the EGR passage 11. Next, the speed V [m/second] of the rich gas R introduced into the filter 9 is calculated by dividing the exhaust gas flow rate Q by a cross section A [$m^2$] of the exhaust passage 4 (see FIG. 3). Then, the moving time of the rich gas R from the fuel addition valve 8 to the filter 9 can be estimated by dividing a distance L [m] of the exhaust passage 4 (see FIG. 3) from the fuel addition valve 8 to the filter 9 by the calculated speed V of the rich gas R. It is possible to determine whether the rich gas R arrives at the filter 9 by determining whether the moving time of the rich gas R elapses after the valve-open control of the fuel addition valve 8 is executed. Namely, it can be estimated that the rich gas R arrives at the filter 9 in a case the estimated moving time elapses after the valve-open control of the fuel addition valve 8 is executed. The cross section A of the exhaust passage 4 and the distance L of the exhaust passage 4 from the fuel addition valve 8 to the filter 9 are prestored in the ROM of the ECU 20 as values relating to the exhaust passage 4 of the engine 1. FIG. 3 shows an example view in which the rich gas R is moving in the exhaust passage 4 in the case fuel is added from the fuel addition valve 8. If it is determined that the rich gas R does not arrive at the filter 9, the current routine is ended.

When it is determined that the rich gas R arrives at the filter 9, the procedure is proceeded to step S13, and the pressure in the exhaust passage 4 upstream from the filter 9 is obtained with reference to the output signal of the upstream exhaust gas pressure sensor 23. In the next step S14, the ECU 20 determines whether a pressure variation amount of a fuel-arrival-time pressure, that is a pressure obtained at the fuel arrival-time, with respect to a pre-valve-open pressure, that is a pressure obtained by the upstream exhaust gas pressure sensor 23 immediately before the valve-open control of the fuel addition valve 8 is executed by the ECU 20, is equal to or lower than a preset predetermined threshold value. When fuel arrives at the filter 9 in the case the fuel is added into the exhaust passage 4 from the fuel addition valve 8, part of the filter 9 is clogged. Therefore, it becomes difficult for exhaust gas to pass through the filter 9, and a pressure in the exhaust passage 4 upstream from the filter 9 increases. It is possible to determine whether the fuel is added into the exhaust passage 4 from the fuel addition valve 8 by determining how much the fuel-arrival-time pressure changes with respect to the pre-valve-open pressure. The predetermined threshold value is set, for example, to a pressure variation amount at the time when the rich gas R arrives at the filter 9, wherein the rich gas R is formed when a minimum necessary amount of fuel for the function recovery process of the filter 9 is added from the fuel addition valve 8.

When the pressure variation amount is equal to or lower than the threshold value, it is estimated that only an amount of fuel less than the minimum necessary amount for the function recovery process of the filter 9 is added into the exhaust passage 4. Thus, it is possible in this case to estimate that some sort of anomaly exists in the fuel addition valve 8 and thus the addition of fuel into the exhaust passage 4 is in trouble. Thus, when it is determined that the pressure variation amount is equal to or smaller than the threshold value, the procedure is proceeded to step S15, and an addition valve anomaly flag is turned ON by the ECU 20, which indicates that anomaly exists in the fuel addition valve 8. Then, the current routine is ended. If it is determined that the pressure variation amount is greater than the threshold value, the procedure is proceeded to step S16, and the ECU 20 turns the addition valve anomaly flag OFF. Then, the current routine is ended. The addition valve anomaly flag is used in another routine executed by the ECU 20, for example, to control an anomaly lamp indicating anomaly in the fuel addition valve 8 for an operator.

By executing the routine shown in FIG. 2, the valve-open control of the fuel addition valve 8 is executed, and it is possible to diagnose the fuel addition valve 8 based on an exhaust gas pressure at an estimate arrival-time, when the rich gas R, which is formed from the fuel added into the exhaust passage 4, is estimated to arrive at the filter 9. In the routine shown in FIG. 2, since the fuel addition valve 8 is diagnosed based on an exhaust gas pressure at the estimate arrival-time when the rich gas R is estimated to arrive at the filter 9, it is possible to suppress the influence of other factors varying the pressure of the exhaust gas, such as pulsation of exhaust gas, on the diagnosis. Thus, it is possible to enhance the precision of a diagnosis.

The ECU 20 may diagnose the fuel addition valve 8 by referring to the output signal of the oxygen concentration sensor 22 in a routine different from the fuel addition valve diagnostic routine shown in FIG. 2. When fuel is added into the exhaust passage 4, the oxygen concentration in the exhaust passage 4 varies in accordance with the fuel amount added into the exhaust passage 4. Therefore, when the oxygen concentration in the exhaust passage 4 does not become lowered to a value equal to or lower than a preset predetermined concentration in the case the valve-open control is executed for the fuel addition valve 8, it is possible to determine that a fuel in an amount required for executing the function recovery process is not added from the fuel addition valve 8, and thus to diagnose that anomaly exists in the fuel addition valve 8. If the diagnosis of the fuel addition valve 8 based on the oxygen concentration in the exhaust passage 4 is carried out in addition to the routine shown in FIG. 2, it is possible to further enhance the precision of a diagnosis of the fuel addition valve 8. If the fuel addition valve 8 is diagnosed based on the oxygen concentration in the exhaust passage 4, the ECU 20 functions as auxiliary diagnosing device of the present invention.

Figure 4:
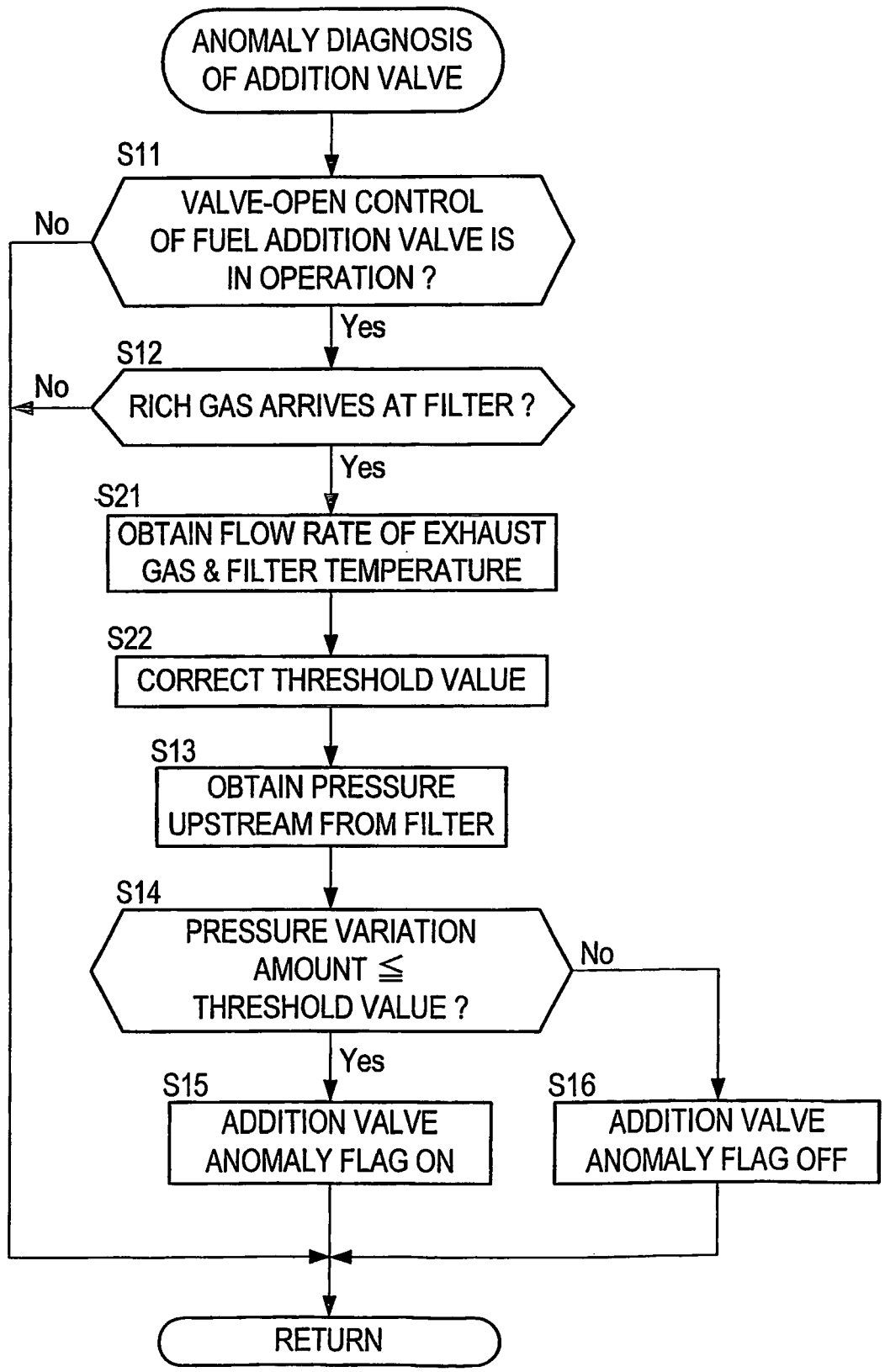
FIG. 4 is a flowchart showing a modification of the fuel addition valve diagnostic routine.

FIG. 4 shows a modification of the fuel addition valve diagnostic routine executed by the ECU 20. In FIG. 4, the same processes are designated with the same reference numerals as in FIG. 2, and explanation thereof will be omitted. Furthermore, the routine shown in FIG. 4 is executed repeatedly at predetermined intervals in the operation of the engine 1. The modification shown in FIG. 4 is different from the routine shown in FIG. 2 in that steps S21 and S22 are added between the steps S12 and S13.

In the routine shown in FIG. 4, the processes up to the step S12 is carried out in the same manner as that shown in FIG. 2. If NO in step S12, the procedure is proceeded to step S21, and ECU 20 obtains a flow rate of exhaust gas and the temperature of the filter 9 when the valve-open control of the fuel addition valve 8 is in operation. The flow rate of exhaust gas is obtained by the same estimating method in step S12. The temperature of the filter 9 is obtained, for example, in a following manner. A temperature sensor which outputs a signal corresponding to the temperature of the filter 9 is provided to the filter 9, and the temperature of the filter 9 is obtained with reference to the output signal.

Figure 5:
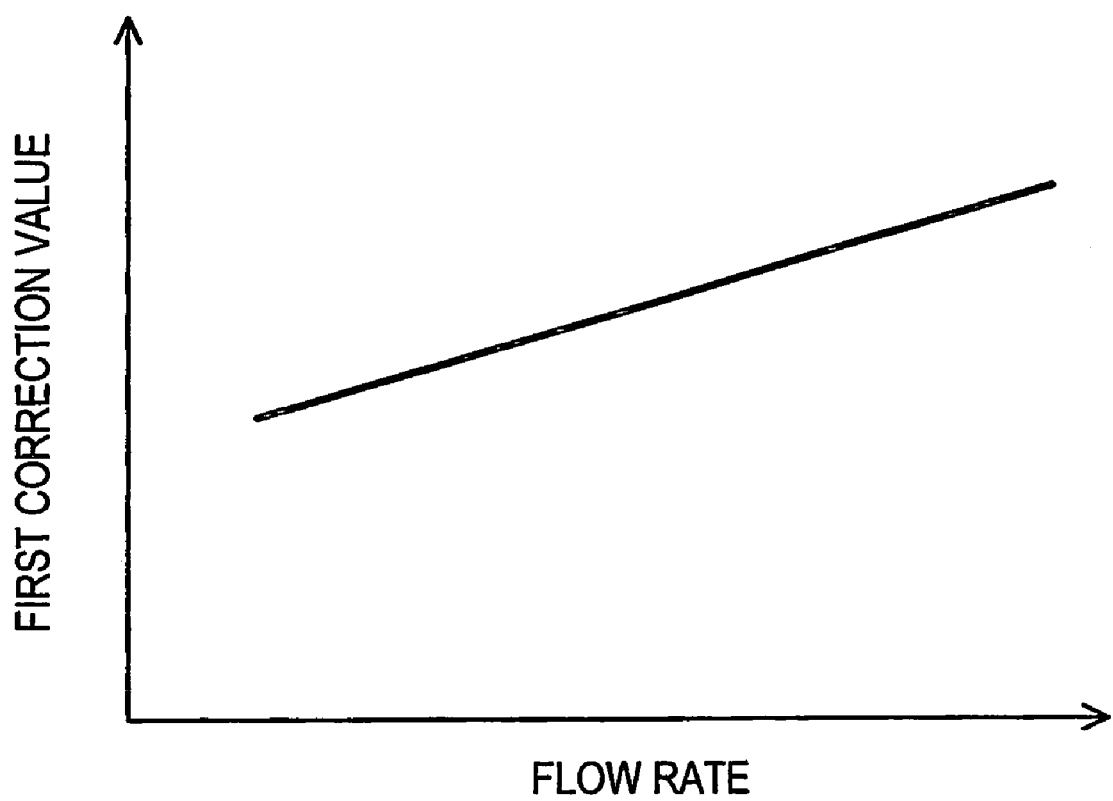
FIG. 5 is a view showing an example of a relation between a flow rate of exhaust gas and a first correction value.
Figure 6:
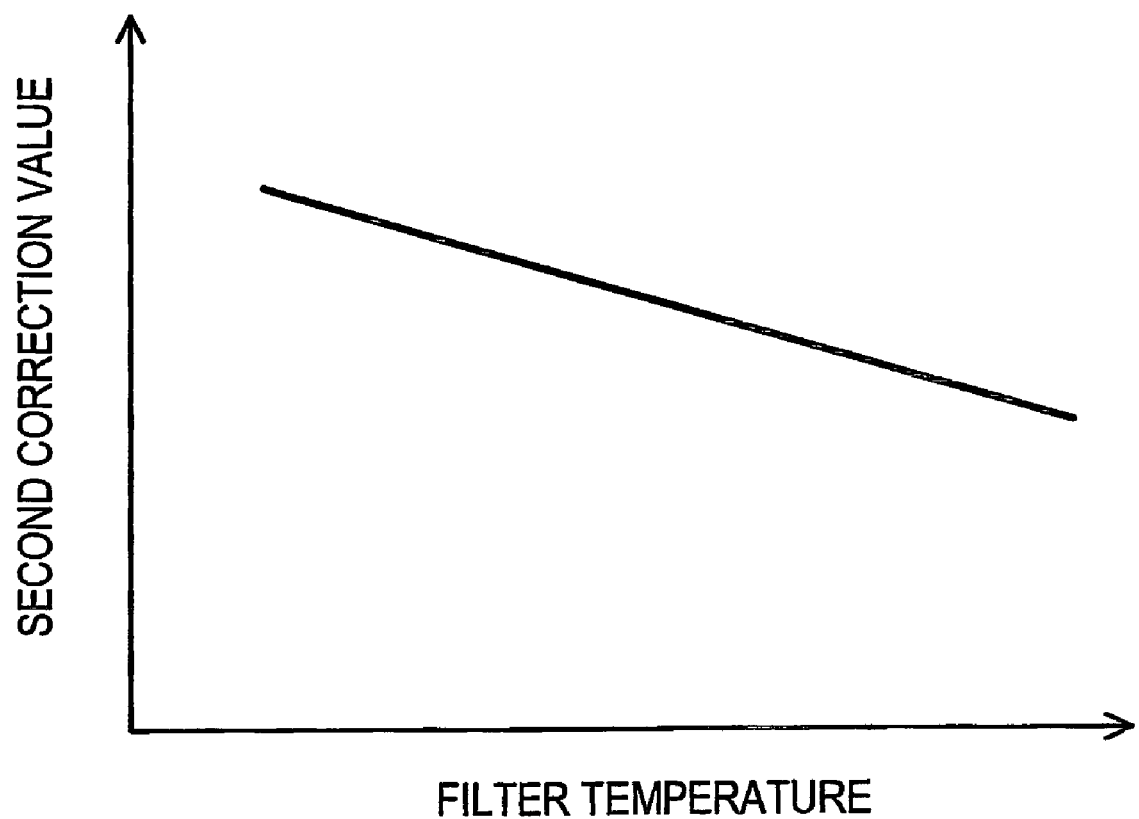
FIG. 6 is a view showing an example of a relation between the temperature of a filter and a second correction value.

In next step S22, the ECU 20 corrects a predetermined threshold value based on the obtained flow rate of the exhaust gas and the temperature of the filter 9. When the rich gas R arrives at the filter 9 and part of the filter 9 is clogged, the pressure variation amount increases as the flow rate of the exhaust gas becomes larger. Thus, the predetermined threshold value is set to a greater value as the flow rate of exhaust gas becomes larger. Since fuel which adheres to the filter 9 is vaporized easier as the temperature of the filter 9 becomes higher, the fuel is vaporized in a shorter time, even when the fuel clogs part of the filter 9. Therefore, the pressure variation amount becomes smaller as the temperature of the filter 9 is higher. Thus, the predetermined threshold value is set to a smaller value as the temperature of the filter 9 becomes higher. These corrections are carried out by multiplying the predetermined threshold value by first and second correction values obtained with reference to maps shown in FIGS. 5 and 6. FIG. 5 shows an example of a relation between the flow rate of exhaust gas and the first correction value. FIG. 6 shows an example of a relation between the temperature of the filter 9 and the second correction value. As shown in FIG. 5, the first correction value becomes greater as the flow rate of exhaust gas becomes higher. As shown in FIG. 6, the second correction value becomes smaller as the temperature of the filter 9 becomes higher. The relations shown in FIGS. 5 and 6 are obtained in advance through experiments or the like and stored in the ECU 20 as maps. Then, the procedure is proceeded to step S13, and the process is carried out in the same manner as that shown in FIG. 2.

In the modification shown in FIG. 4, since the predetermined threshold value is corrected based on the flow rate of exhaust gas and the temperature of the filter 9, the precision of the diagnosis can further be enhanced. Furthermore, the predetermined threshold value may be corrected based on either one of the flow rate of exhaust gas and the temperature of the filter 9. In this case, the process in step S22 can be simplified. If the ECU 20 executes the step S22 shown in FIG. 4, the ECU 20 functions as threshold value correcting device of the present invention.

The present invention is not limited to the above-described embodiments, and can be carried out in various modes. For example, the invention is not limited to diesel engine and can be applied to various internal combustion engines utilizing gasoline or other fuel. The reducing agent of the invention is not limited to diesel oil. For example, alcohol or gasoline may be added into the exhaust passage as a hydrocarbon-based reducing agent.

The exhaust gas purifying device provided in the exhaust gas purifying apparatus is not limited to device which supports the store-reduction type NOx catalyst material in a particulate filter. For example, an exhaust gas purifying catalyst having a support supporting a store-reduction type NOx catalyst may be provided. The present invention is also applicable for the case because the NOx reduction and S-recovery are carried out at predetermined intervals. Furthermore, only the particulate filter may be provided in the exhaust gas purifying apparatus as the exhaust gas purifying device. The present invention is also applicable for the case because the PM-recovery is carried out at predetermined intervals.

The invention claimed is:

1. An exhaust gas purifying apparatus for an internal combustion engine, comprising:
   a recoverable type exhaust gas purifying device provided in an exhaust passage;
   a reducing agent addition device for adding a reducing agent into the exhaust passage upstream of the exhaust gas purifying device;
   an operation control device for controlling operation of the reducing agent addition device such that the reducing agent is added into the exhaust passage in a recovering process of the exhaust gas purifying device;
   a pressure obtaining device for obtaining a pressure in the exhaust passage downstream from the reducing agent addition device and upstream from the exhaust gas purifying device; and
   a diagnosing device for diagnosing the reducing agent addition device based on the pressure obtained by the pressure obtaining device at an estimate arrival-time when the reducing agent added from the reducing agent addition device is estimated to arrive at the exhaust gas purifying device in a case the operation of the reducing agent addition device is controlled by the operation control device such that the reducing agent is added into the exhaust passage.

2. The exhaust gas purifying apparatus according to claim 1, wherein
   the diagnosing device diagnose that anomaly exists in the reducing agent addition device when a difference between the pressure obtained by the pressure obtaining device at the estimate arrival-time and the pressure obtained by the pressure obtaining device before the operation of the reducing agent addition device is controlled by the operation control device is equal to or smaller than a predetermined threshold value.

3. The exhaust gas purifying apparatus according to elate claim 2, wherein
   the diagnosing device includes a threshold value correcting device which corrects the predetermined threshold value based on at least one of the flow rate of exhaust gas and the temperature of the exhaust gas purifying device in a case the operation of the reducing agent addition device is controlled by the operation control device such that the reducing agent is added into the exhaust passage.

4. The exhaust gas purifying apparatus according to claim 2, wherein
   a particulate filter which collects particulates in exhaust gas is provided as the exhaust gas purifying device, and
   the pressure obtaining device is a pressure difference obtaining device which obtains a pressure of exhaust gas upstream of the particulate filter and a pressure of exhaust gas downstream of the particulate filter and obtains a difference between these pressures.

5. The exhaust gas purifying apparatus according to claim 2, wherein
   a hydrocarbon-based reducing agent is added from the reducing agent addition device.

6. The exhaust gas purifying apparatus according to claim 5, further comprising:
   an oxygen concentration obtaining device for obtaining oxygen concentration in the exhaust passage downstream from the reducing agent addition device and upstream from the exhaust gas purifying device; and an auxiliary diagnosing device for diagnosing the reducing agent addition device based on the oxygen concentration obtained by the oxygen concentration obtaining device at the estimate arrival-time in a case the operation of the reducing agent addition device is controlled by the operation control device such that the reducing agent is added into the exhaust passage.

* * * * *